Jan. 17, 1950     J. M. ROBBINS     2,495,022
REAR WINDOW FOR COLLAPSIBLE TOPS FOR AUTOMOBILES
Filed May 1, 1948     2 Sheets-Sheet 1
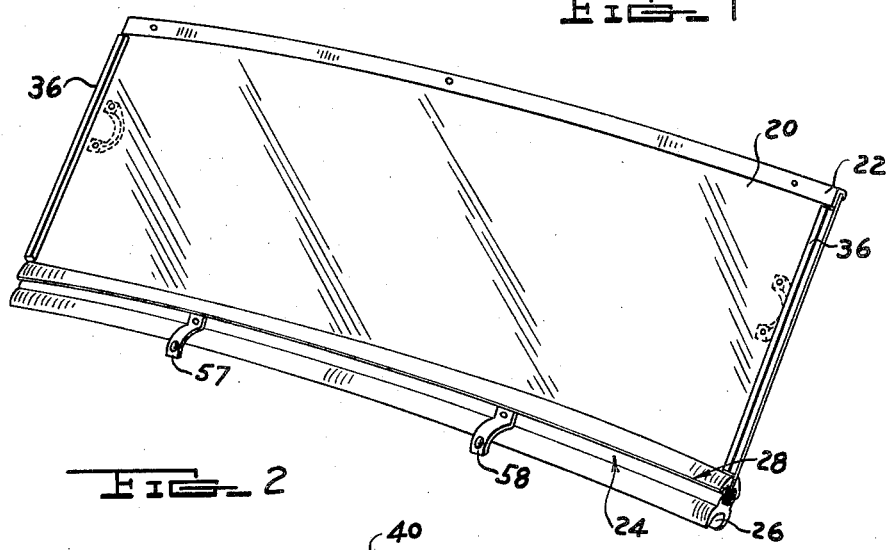
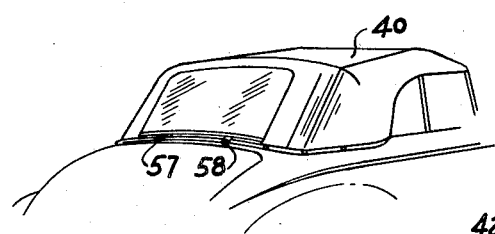
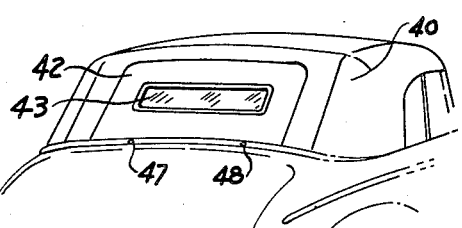
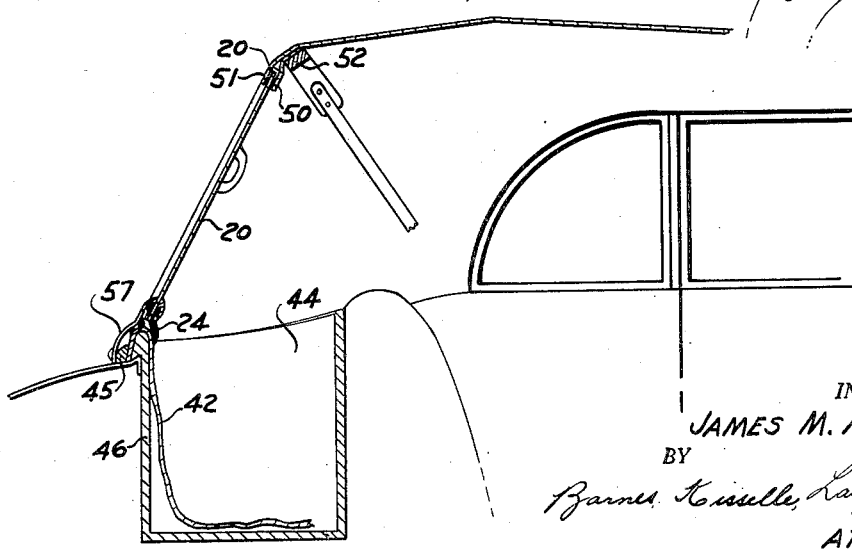
INVENTOR.
JAMES M. ROBBINS
BY
ATTORNEYS

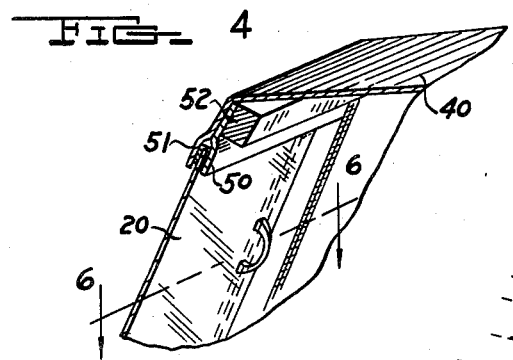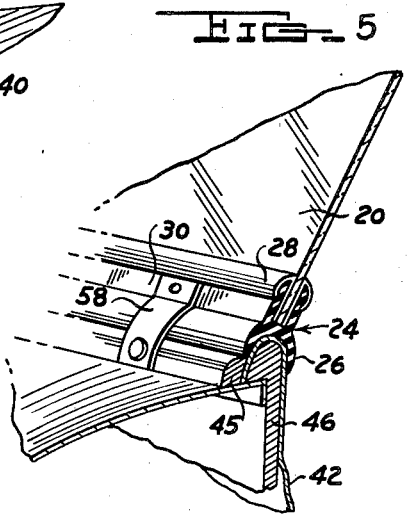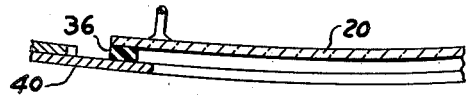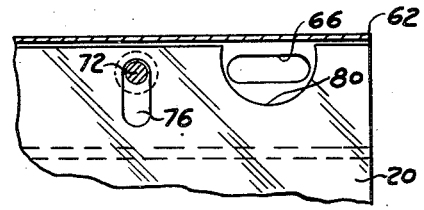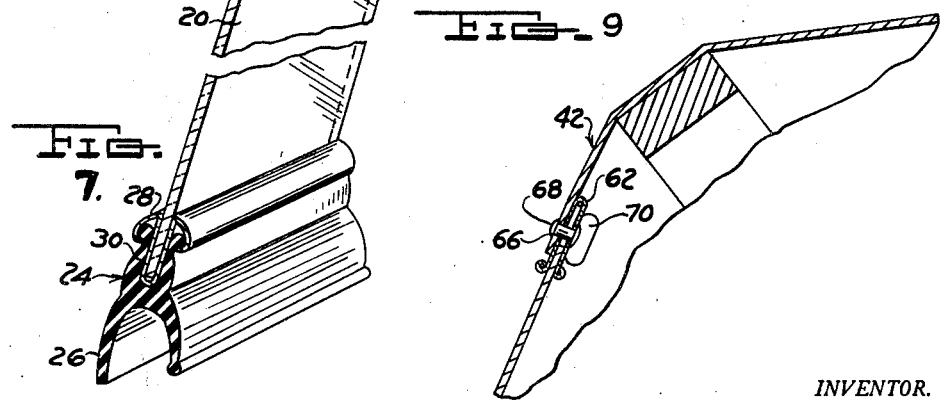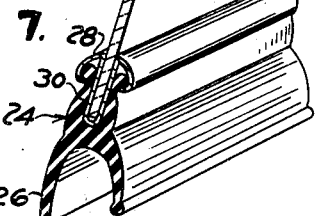

Patented Jan. 17, 1950

2,495,022

UNITED STATES PATENT OFFICE 2,495,022

REAR WINDOW FOR COLLAPSIBLE TOPS
FOR AUTOMOBILES

James M. Robbins, Ferndale, Mich.

Application May 1, 1948, Serial No. 24,458

5 Claims. (Cl. 296—145)

1

This invention relates to a rear window for collapsible tops for automobiles such as convertible roadsters.

The present type of collapsible tops for automobiles have a rear window which is relatively long and narrow to permit it to be folded into the space provided for the top. This window is usually held in a back flap which is fastened at the bottom and which is free at the sides and top where it may be removably positioned within the large opening at the rear of the top when in extended position.

It is an object of the present invention to provide a closure means for this large opening in the back of the convertible top so that full and adequate vision is possible through the rear of the top and full protection from the weather is provided.

It is another object of the invention to provide a closure means which may be inserted swiftly and easily without the installation of any fastening means or the removal of any parts from the standard top.

It is another object of the invention to provide a closure means which may be readily removed and placed out of the way if it is desired to lower the top or to have an open back.

It is a further object to provide a closure means and fastening means therefor which presents a pleasing appearance and which increases rear vision and removes blind spots in the driver's viewing range.

Other objects and features of the invention relating to details of construction and particularly to the fastening means which renders the adaptation to various models will be apparent in the following description and claims.

Drawings accompany the specification and the various views thereof may be briefly described as:

Figure 1, a perspective view of a completed closure means.

Figure 2, a partial view of a convertible coupe with the closure means in position.

Figure 2A, a partial view of a convertible coupe showing the standard type of back window and back flaps.

Figure 3, a vertical section through the rear portion of a convertible top illustrating one embodiment in position.

Figure 4, a vertical section in perspective, illustrating the details of the fastening means utilizing the top of the closure in Figure 3.

Figure 5, a sectional perspective illustrating the means of fastening the bottom of the closure.

2

Figure 6, a sectional view on lines 6—6 of Figure 4.

Figure 7, a perspective section of a modified type of construction.

Figure 8, details of an adjustable feature of the embodiment of Figure 7.

Figure 9, a partial view of an installation of the embodiment of Figure 7 illustrating the top fastening means.

In Figure 1 it will be seen that the closure means consist of a transparent panel 20, rectangular in shape, and curved slightly in horizontal section. The panel is preferably formed of a non-shattering material such as Plexiglas having sufficient strength and rigidity to maintain its own shape. The top edge of the panel is edged by a molding 22 which is suitably fastened to the panel by bolts or rivets. The bottom edge of the panel is formed by a rubber molding 24 having bifurcate portion in the form of spaced flaps 26 at the bottom. The top of the molding also have a split formation which forks over the bottom edge of the panel but is separated therefrom by a molding 28 which overlies the bottom edge of the panel and is turned back on each side to overlie the top edges of the rubber molding 24 (see Fig. 5).

The molding 28 preferably has a snug fit on the bottom of the panel 20 and also is pressed tightly against the upper rubber flaps 30 of the molding 24 to get a good weather seal. Along the sides of the outer surface of the panel 20 are sealing strips 36 preferably formed of a soft material such as sponge rubber and extending between the molding 28 and the molding 22. The molding 28 is preferably a rolled section although it may be an extruded section and be equally effective. The parts are all formed for this lower edge so that they may be slipped together for frictional engagement in assembly and the panel need not be perforated along its edges.

A convertible such as shown in Figure 2A has a top 40 and back flap 42 with window 43. The back flap is fastened at the bottom edge and in some models is zipped around the edge. This flap may be unzipped and dropped into a well 44 within the car (see Fig. 3). The back flap is fastened in a molding 45 and passes over the top edge of panel 46 or what I call the rim of the tonneau. This is sometimes referred to as a belt rail. Along the molding 45 are a plurality of snap buttons for holding a cover in place over the well 44 when the top is completely collapsed. These buttons are shown at 47 and 48 in Figure 2A.

When installing the closure member 20, it may be first raised to position and the top molding 20 can be inserted between a portion 51 bordering the top edge of the opening and a flap 50 attached thereto as appears in certain types of cars such as the Plymouth and Chrysler. These flaps 50 and 51 are located quite closely adjacent the top supporting rib 52 and there is sufficient rigidity at this point of the top to give adequate support for the closure panel 20. The lower portion of the panel may then be fitted over the back flap 42 which has been folded down and will snugly engage the top of a panel 46 in a body construction. Two fastening tabs 57 and 58 may then be snapped onto the buttons 47 and 48 to secure the closure means in place.

Figure 5 shows the details of the construction at the lower edge of the closure member 20 when installed. In Figure 6, which is a horizontal section on line 6—6 of Figure 4, it will be seen that the side sealing strip 36 is pressed snugly against the side edge of the top 40 due to the fact that these edges are customarily in a taut condition.

In some makes of body such as Chevrolet and other General Motors cars, the back flap 42 of a convertible top construction is buttoned in place by twist buttons. For this type of construction, the top edge of panel 20 is provided with a U-shaped molding 62 which had rolled edges 64 (Fig. 7). The molding 62 is provided with a plurality of longitudinally extending slots 66 adapted to cooperate with twist button fastening means as shown in Figure 9 where button 68 is fastened to the top 42 and has a fastening portion 70 which has passed through a slot 66 in molding 62 and been twisted transversely to the slot to hold the molding in place.

To adapt the embodiment of Figure 7 to various models, the molding 62 has been made adjustably vertical on the closure member 20. The molding is fastened to the closure member by bolts 72 and nuts 74. The bolts 72 pass through vertically extended slots 76.

It will be noted that the fastening slots 66 are positioned adjacent semi-circular notches 80 in the top edge of the panel 20 (see Fig. 8).

The molding 62 may be adjusted vertically on the panel when the first installation is made in any particular model of convertible automobile after which the nuts 74 may be tightened and a permanent adjustment maintained. Once this adjustment is made, the panel may be inserted and removed without it.

What I claim is:

1. A closure means for the back flap opening in a collapsible convertible automobile top which comprises a transparent, relatively rigid panel longer and wider than said opening, reinforcing means at the top edge of said panel, and weather sealing means at the lower edge of said panel comprising an H-shaped section compressible strip, the bottom edge of the panel being received between the upper legs of the H-section and the lower legs of the H-section being spaced to overlie a portion of the automobile body, including the folded back flap forming the lower margin of the back flap opening, and clamping means engaging the lower edge of the panel between the upper legs and formed to engage the outer surface of one or more of said legs to secure the compressible strip to the panel in tight longitudinal relation to the clamping means.

2. A closure means for the back flap opening in a collapsible convertible automobile top which comprises a transparent panel longer and wider than said opening, reinforcing means at the top edge of said panel, and weather sealing means at the lower edge of said panel comprising an H-shaped section compressible strip, the bottom edge of the panel being received between the upper legs of the H-section and the lower legs of the H-section being spaced to overlie a portion of the automobile body, including the folded back flap forming the lower margin of the back flap opening, and clamping means to secure the compressible strip to the panel comprising a U-shaped section receiving the edge of the panel in tight frictional engagement and reverse folds on the sides of said U-shaped section to clamp the upper legs of the H-section.

3. A closure means for the back flap opening in a collapsible convertible automobile top which comprises a transparent, relatively rigid panel longer and wider than said opening, reinforcing means at the top edge of said panel, and weather sealing means at the lower edge of said panel comprising an H-shaped section compressible strip, the bottom edge of the panel being confined between the upper legs of the H-section and the lower legs of the H-section being spaced to overlie a portion of the automobile body, including the fastened edge of the folded back flap forming the lower margin of the back flap opening, spaced vertical slots and semi-circular notches formed at the top of the transparent panel, the top reinforcing means being slotted at spaced intervals to correspond to the notches of the panel, and releasable means passing through said reinforcing means and said panel slots to permit vertical adjustment of said reinforcing means relative to said panel.

4. An all transparent back panel as a substitute for the ordinary flexible back flap and back window of a collapsible top of a convertible car having a body member extending along the lower margin of the window opening, which comprises a relatively firm transparent panel frame members for the edges of said transparent panel, the upper frame member seating at the top of the rear opening when the back flap is dropped, weatherstrips along the outside of the ends of the transparent panel for abutting against the top material adjacent the ends of the back opening, and deformable water impervious sealing means on the said frame member along the lower edge of the panel channeled to provide a resilient load bearing surface to bear on the top edge of the body member along the lower edge of the back opening in the top when the back flap has been released from the side and top edges of the back opening and to provide a downwardly extending outer lip to overlie the body member to furnish a weather protective member, and means for fastening the transparent panel in the window opening comprising tabs secured to the lower frame member of the panel and having openings, and fasteners on the body member to co-operate with said tab openings.

5. An all transparent back panel as a substitute for the ordinary flexible back flap and back window of a collapsible top of a convertible car having a body member extending along the lower margin of the window opening, which comprises a relatively firm transparent panel, frame members for the edges of said transparent panel, the upper frame member seating at the top of the rear opening when the back flap is dropped, weatherstrips along the outside of the ends of the transparent panel for abutting against the top material adjacent the ends of the back opening, and deformable water impervious sealing means on the said frame member along the lower edge of the panel channeled to provide a resilient load bearing surface to bear on the top edge of the body member along the lower edge of the back opening in the top when the back flap has been released from the side and top edges of the back opening and to provide a downwardly extending outer lip to overlie the body member to furnish a weather protective member, the frame member along the top edge of the transparent panel comprising a channel having slots through which the wings of turn buttons on the convertible top may be passed to lock the frame in place in the back window opening and also vertical slots for clamping the frame member to the top edge of the transparent panel adjustably to properly size the substitute panel to the back window opening.

JAMES M. ROBBINS.

REFERENCES CITED

The following references are of record in the file of this patent:

UNITED STATES PATENTS

| Number | Name | Date |
| --- | --- | --- |
| 1,109,475 | Sipperley | Sept. 1, 1914 |
| 1,440,344 | Donnelly | Dec. 26, 1922 |
| 1,637,812 | Ferguson | Aug. 2, 1927 |
| 1,681,037 | Hall | Aug. 14, 1928 |
| 1,747,677 | Nathan | Feb. 18, 1930 |
| 2,002,596 | Westrope | May 28, 1935 |
| 2,189,138 | Eichner | Feb. 6, 1940 |